United States Patent [19]

Nakatani

[11] Patent Number: 4,517,313

[45] Date of Patent: May 14, 1985

[54] METHOD OF MAKING POLYURETHANE FOAM

[75] Inventor: Keiichi Nakatani, Kyoto, Japan

[73] Assignee: Abbott Laboratories, North Chicago, Ill.

[21] Appl. No.: 598,776

[22] Filed: Apr. 11, 1984

[51] Int. Cl.$^3$ .................. C08G 18/14; C08G 18/18; C08G 18/20

[52] U.S. Cl. .................. 521/51; 264/328.1; 528/49; 428/308.4; 428/310.5; 521/129; 521/130; 521/904

[58] Field of Search .................. 521/129, 130, 51; 528/49

[56] References Cited

U.S. PATENT DOCUMENTS

| | | | |
|---|---|---|---|
| 2,932,621 | 4/1960 | Terry | 521/130 |
| 3,425,964 | 2/1969 | Stanley | 521/130 |
| 3,706,687 | 12/1972 | Rudzki | 521/129 |
| 3,769,244 | 10/1973 | Hashimoto et al. | 521/129 |
| 3,824,199 | 7/1974 | Nadeau et al. | 521/129 |
| 4,066,580 | 1/1978 | Falkenstein et al. | 521/129 |
| 4,293,658 | 10/1981 | Raden et al. | 521/129 |
| 4,419,461 | 12/1983 | Arbir et al. | 521/129 |
| 4,421,673 | 12/1983 | Arbir et al. | 521/129 |
| 4,421,869 | 12/1983 | Arbir et al. | 521/129 |

OTHER PUBLICATIONS

Buist et al., Developments in Polyurethanes-1, Applied Science Publ., London (1978).

Primary Examiner—Herbert S. Cockeram
Attorney, Agent, or Firm—Steven F. Weinstock

[57] ABSTRACT

A method of manufacturing polyurethane foam by a reaction of organic polyisocyanates and polyols in the presence of a foaming agent and catalysts comprises using as the catalyst, a salt of carbonic acid and polyamine represented by the general formula:

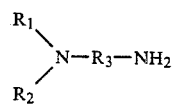

wherein $R_1$ and $R_2$ are an alkyl group having 1–4 carbon atoms or $R_1$ and $R_2$ are combined to form a heterocyclic ring having 3–6 carbon atoms together with a nitrogen atom; and $R_3$ is an alkylene group.

4 Claims, No Drawings

METHOD OF MAKING POLYURETHANE FOAM

TECHNICAL FIELD

The present invention relates to a method of manufacturing polyurethane foam. Furthermore, it relates to the method of molding foam which has no unpleasant amine odor at the time of demolding, no tendency to discolor or deteriorate the covering film and coating vehicle of urethane molds or a surface skin such as polyvinylchloride or the like.

BACKGROUND OF THE INVENTION

Prior art methods of molding foam include the pouring process and so-called "reaction type liquid injection process", that is, reaction injection mold process (hereinafter referred to simply as RIM), which uses the combination of the main catalysts such as triethylenediamine[1,4-diazabicyclo(2,2,2)octane] and the like and the co-catalysts such as N-methyl and ethyl morpholines, N,N,N',N'-tetramethylethylenediamine, triethylamine and the like which are volatile amines.

However, triethylenediamine as the main catalyst has a very strong sublimation property, and therefore, the surface skin of the molded foam such as polyvinylchloride is severely discolored by the dehydrochlorination reaction with the migrated triethylenediamine. In the case of RIM foams, an aluminum powder contained in the metallic surface coating layer is subjected to discoloration and corrosion as a result of the sublimation of triethylenediamine to the metallic coating layer. On the other hand, volatile tertiary amines are very effective co-catalysts for skin formation of the molded foams, although the vapor, the objectionable odor at demolding, and the acute and chronic toxicity create severe problems.

It is known that dialkyl substituted primary amines were used as the catalyst for polyurethane foams (Japan Kokai No. Sho 46-4846). However, the primary amines have the same unpleasant odor and toxicity problems as do the above-mentioned volatile tertiary amines, and further, the primary amines have poor flow properties and poor molding abilities, especially to the corners and the ends of complicated shapes in the molding dies.

DISCLOSURE OF THE INVENTION

In accordance with this invention, a method of manufacturing polyurethane foam by a reaction of organic polyisocyanates and polyols in the presence of a foaming agent and catalysts comprises using as the catalyst, a salt of carbonic acid and polyamine represented by the general formula:

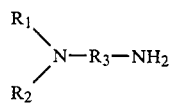

wherein $R_1$ and $R_2$ are an alkyl group having 1–4 carbon atoms or $R_1$ and $R_2$ are combined to form a heterocyclic ring having 3–6 carbon atoms together with a nitrogen atom; and $R_3$ is an alkylene group. Likewise, a method of manufacturing polyurethane molded foam having surface skin comprises using as the catalyst the above salts of carbonic acid and polyamines.

In the present invention, alkyl groups having 1–4 carbon atoms include methyl, ethyl, n- or iso-propyl, n- or iso-butyl and other n- or iso-alkyl groups. $R_1$ and $R_2$ may be combined to form ethylene, n- or iso-propylene, tetramethylene, pentamethylene and the like, with the nitrogen atom to form a heterocyclic ring having 3–6 members. From the viewpoint of catalytic activity, the most preferable $R_1$ and $R_2$ are methyl groups.

Alkylene groups include $C_2$–$C_{12}$ groups such as ethylene, n-propylene, tetramethylene, hexamethylene, 2-ethylhexylene, decamethylene, etc., which are straight or branched chain alkylene groups. From the viewpoint of catalytic activity, the most preferable $R_3$ is ethylene, n-propylene or n-butylene.

Representative compounds indicated in formula (1) include, for example, (1) Salt of dialkylaminoalkylamine

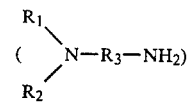

and carbonic acid; dialkylaminoalkylamine: dimethylaminoethylamine, dimethylaminopropylamine, diethylaminopropylamine, dibutylaminoethylamine, dimethylaminooctylamine, dipropylaminopropylamine and carbonic acid.

(2) Salt of heterocyclic aminoalkylamine

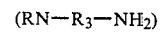

and carbonic acid; heterocyclic aminoalkylamine: 2-(1-aziridinyl)-ethylamine, 4-(1-piperidinyl)-2-hexylamine and carbonic acid.

The most preferable salts of polyamines and carbonic acid are carbonic acid salts of dimethylaminopropylamine and dimethylaminoethylamine.

The molar ratio of the polyamines and carbonic acid is normally 7 to 1:1 to 4, preferably 5 to 1:1 to 3. In the case of more than 7:1 molar ratio, there is an unpleasant odor of free amine and toxicity problems for humans as a result of the amine vapor. In the case of 1:more than 3, the catalytic activity is decreased and the surface covering material such as polyvinylchloride of polyurethane foam is discolored.

The said salt is easily prepared by known methods, for example, by contacting, mixing and stirring polyamine aqueous solution with carbon dioxide gas or Dry Ice under atmospheric or higher pressure with cooling, or conversely by adding polyamine dropwise into carbonic acid aqueous solution.

The carbonic acid salts of polyamines obtained by the reaction are represented by the following general formula:

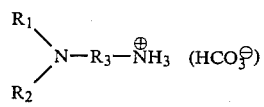

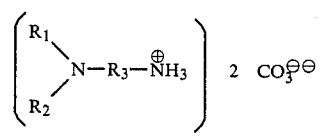

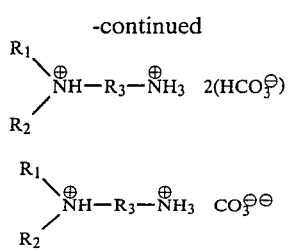

(In the above formulas, $R_1$, $R_2$ and $R_3$ are the same as the previous description.)

The catalyst in the present invention is used by itself, and, if necessary, can be used with other known main catalysts such as amine catalysts: 1,8-diazabicyclo(5,4,-0)undecene-7, or its salts of organic acids, 1,3,5-tris-(3-dimethylaminopropyl)hexahydro-s-triazine, N,N,N-tris(3-dimethylaminopropyl)-amine, N-methyl-N,N-bis(3-dimethylaminopropyl)amine. As above, amine catalysts having relatively higher molecular weight and non-smell properties are preferable. Furthermore, the catalysts of the invention may be employed with other amine catalysts such as 1,4-diazabicyclo(2,2,2)octane, N,N-dimethylaminoethanolamine and/or metallic catalysts such as stannous octoate, dibutyl tin dilaurate, Fomrez UL-22 (Witco Chemical) and the like.

The ratio of the catalyst to amine catalyst used in the present invention is normally 1:10 to 10:1, preferably 1:4 to 4:1. The ratio of the invention catalysts and metallic catalysts is generally 1:5 to 1:0.001, preferably 1:1 to 1:0.01.

In the present invention, it is possible to use every kind of organic polyisocyanates and polyols which are normally used for rigid, semi-flexible and flexible foams, elastomer foam and molded foam.

Representative organic polyisocyanates and aromatic polyisocyanates such as tolylene diisocyanate, diphenylmethane diisocyanate, aliphatic isocyanates such as hexamethylene diisocyanate, cycloaliphatic isocyanates such as isophorone diisocyanate and modified isocyanates such as a carbodiimido modified group. The most preferable isocyanates are aromatic polyisocyanates.

Representative polyols are high molecular weight polyols such as polyetherpolyols which are adducts of alkylene oxides (ethylene oxide, propylene oxide, butylene oxide) to water, poly-functional alcohols (ethylene glycol, glycerine, trimethylolpropane, triethanolamine, pentaerythritol, sorbitol, sugar) and amine compounds (ethylene diamine, diethylenetriamine, tolylenediamine, xylylenediamine, piperidine, N-alkylaminopiperazines, N,N-dimethylaminopropylamine, cyclohexylenediamine, etc.); polymerpolyols which are reaction products of the above polyetherpolyols and ethylenic unsaturated monomers (acrylonitrile, styrene, methylmethacrylate, butadiene, etc.) in the presence of polymerization catalysts such as radical producers (U.S. Pat. No. 3,383,351); polyesterpolyols which are reaction products between polycarboxylic acids (succinic acid, fumaric acid, phthalic acid, dimeric acid, sebacic acid, maleic acid, adipic acid, etc.) and the above mentioned polyalcohols; polyetherpolyesterpolyols and the mixture of two or more of the above mentioned polyols.

Among these polyols, the preferable polyols are polyetherpolyols and polymerpolyols. The OH-value of polyol is selected in the range of 10 to 600 in accordance with the requested physical properties of the resulted foam. In the case of flexible foam, the OH-value is generally 10 to 100, preferably 15 to 70, and for rigid foam it is generally more than 200, preferably more than 400 and about 50 to 150 of OH-value indicating polyol or the mixture of low OH-value polyol for flexible and high OH-value polyol for rigid foam. Furthermore, primary hydroxyl group-containing polyol (containing over 20%, preferably over 30% of primary OH group) is also useful, especially for molded foam or RIM.

In the present invention, a cross-linking agent or chain extender is also used, if necessary, for example, with low molecular weight polyol (triethanolamine, diethanolamine, ethyleneglycol, diethyleneglycol, butanediol, trimethylolpropane, glycerine, p-bis(2-hydroxyethyl)-phenyleneether, etc.), and polyamine (tolylenediamine, xylylenediamine, diaminodiphenylmethane, methylene-bis-o-chloraniline, etc.)

In the present invention, representative foaming agents are halogen-substituted aliphatic hydrocarbons (Freon gas, methylenechloride, etc.) and water. If necessary, it is applicable to use surfactant (silicone surfactant), color, filler, flame-retardant, stabilizer, etc.

In manufacturing polyurethane foam involved in the present invention, generally 0.01 to 5% and preferably 0.1 to 1 weight % of catalyst relative to polyol is used. In the case of less than 0.01%, the catalytic activity is too low, and the reaction takes longer to complete. In the case of over 5%, the physical properties are decreased, especially ILD.

The manufacturing method in the present invention is the same as the previously known methods; for example, one shot method, prepolymer method. This invention is also applicable for the manufacture of elastomers or sealants, and in this case, the main raw materials, the additives, the equivalent ratio and the amount used are the same as outlined above.

The method of the present invention is particularly useful for the manufacture of molded foams having surface skin of polyurethane elastomer or polyvinylchloride (PVC), and also applicable for other foam products: molded foam by RIM process, open mold foam, vacuum mold foam, cold-cured foam, hot-cured foam, slab foam, foamed-in-place, spray, pouring, coating, impregnation, etc.

The molded foam having surface skin can be manufactured by conventional processes. For example, "A" component is prepared by mixing polyols, cross-linkers, catalysts, blowing agents, pigments, surfactants, etc. and "B" component is polyisocyanates. Both components are charged in stock tanks of the foaming machine. Both components are mixed thoroughly by the mixing-head, charged into an open mold die through a nozzle and then the mold is closed, cured by heat and demolded. Urethane molds having various kinds of surface skin are obtained by many modifications to the die.

Integral skin polyurethane foam is one molded foam having polyurethane elastomer skin. In this case, the foaming mixture charged in the mold die forms tough skin inside the mold die naturally, and is very useful since the same mixture gives both an inner cellular part and an outside non-cellular skin at the same time. (See, for example, Japan Publication No. 1387/1972). Transfer-Coat-Molding (TCM) method is also available. In this method, one component linear polyurethane resin solution is coated inside of the mold die uniformly and then dried to give skin. Thereafter, the foaming mixture is charged into the mold die and the skin is transferred to the foam at the time of demolding.

Otherwise, as indicated in British Pat. No. 1,392,119, linear polyurethane elastomeric surface skin is made by organic polyisocyanate and polyol as formed inside of the mold die. A two component polyurethane middle layer is formed which consists of an isocyanate group-containing polyurethane prepolymer and an active hydrogen-containing polyol. Prior to completion of curing of the two-component middle layer, the foaming mixture is poured into the mold die and cured.

In the case of manufacturing PVC surface skin foam, a non-rigid PVC sheet is set inside of the mold die by vacuum forming in advance and then the foaming mixture is charged, or plastic sol of PVC is applied inside of the mold die and then the sol is converted to film inside of the die by heat (slash mold method); thereafter, the foaming mixture is charged and foamed.

The above polyurethane foams can be manufactured by using the catalyst in the present invention.

Polyurethane mold foams can be manufactured by conventional RIM process. For example, the "A" component is prepared by mixing polyol, cross-linker, catalyst, and if necessary, a blowing agent (water or Freon 11), and the "B" component is polyisocyanate. Both components are charged in stock tanks of a high pressure foaming machine. The pouring nozzle of the machine is jointed to the bunghole of the mold die in advance. Both components are mixed by the mixing head and charged into the closed mold die, and are demolded after curing.

In the manufacture of urethane foam using carbonic salts of polyamines of the present invention as the catalyst, the objectionable odor and the toxicity caused by amine vapor is very low, compared with volatile amine catalysts. Furthermore, the flow property of the foaming mixture at the initial stage of reaction is excellent and therefore, it is suitable for making large molded foams or complicated shape molds. The catalyst in the present invention possesses a primary amino group which easily reacts with the isocyanate group. Therefore, the catalyst in the present invention is combined with a foam structure and there is almost no opportunity to generate an unpleasant odor at demolding time.

The method of manufacturing polyurethane foam having surface skin of polyurethane elastomer or PVC catalyzed by the catalyst in the present invention indicates the following excellent properties compared with the current methods:

(1) Volatile tertiary amines are currently used as a co-catalyst for the purpose of obtaining excellent surface skin, but the unpleasant odor and toxicity problems are objectionable. On the contrary, the salts of carbonic acid and the polyamines in the present invention are colorless to pale yellow, have little odor and are liquid, and therefore, easy to handle. (The polyamines which are the main component in the present invention are fume generating and have a very strong objectionable odor.) Therefore, in the case of the manufacture of the "A" component, the objectionable odor is a great problem. On the other hand, there is no odor problem with the catalysts in the present invention.

(2) The volatile amines contained in molded foams have an unpleasant odor and demonstrate toxicity problems at demolding time, especially in the case of hot mold foams. The catalysts in the present invention are reactive with isocyanate groups and, therefore, there is almost no odor problem.

(3) The flow property of the foaming mixture with the catalysts of the present invention are excellent compared with the conventional volatile amines in the market. Therefore, the method involved in the present invention is suitable for the manufacture of molded foams of large size and/or complicated shapes with no voids.

(4) As mentioned in (2), the catalysts in the present invention do not discolor PVC surface skin, while triethylenediamine, as well as the other conventional amine catalysts discolor PVC surface skin by sublimation and migration of the catalyst to the PVC surface skin.

(5) Triethylenediamine, widely used as the main catalyst at present, has a strong tendency for sublimation and migration to the molded surface and generates a color change in aluminum formulated in metallic coatings and causes discoloration of non-yellowing polyurethane top coatings. On the contrary, the catalysts in the present invention do not have the above problem.

The foregoing may be better understood from the following examples, which are prescribed for purposes of illustration and are not intended to limit the scope of the present invention.

The abbreviations used in the examples of this invention are explained as follows:

| | |
|---|---|
| DMAPA | dimethylaminopropylamine |
| DEAPA | diethylaminopropylamine |
| DMAEA | dimethylaminoethylamine |
| DEAEA | diethylaminoethylamine |
| DMAPA · carbonic acid (4:3) | salt of dimethylaminopropylamine and carbonic acid (4:3 molar ratio) |

REFERENCE 1

(Comparison in odor of catalysts)

At the atmosphere of 20° C.×65% RH, ten randomly selected persons compared the odors of each catalyst of 10 ml in a 100 ml beaker. The results are shown in Table I.

The catalysts in the present invention were odorless or almost odorless. On the contrary, the diamines themselves used for preparing the catalyst in the present invention generated a white fume and an extremely strong odor. The other tertiary amines also generated objectionable odors ranking 4.

TABLE I

| Catalysts | Odor | Remarks |
|---|---|---|
| (carbonic acid salts) | | |
| DMAPA:carbonic acid (4:3) | 0 | of the invention |
| DMAPA:carbonic acid (4:1) | 1 | of the invention |
| DEAPA:carbonic acid (4:3) | 0 | of the invention |
| DEAPA:carbonic acid (4:1) | 1 | of the invention |
| DMAEA:carbonic acid (4:3) | 1 | of the invention |
| DMAEA:carbonic acid (4:1) | 1 | of the invention |
| DEAEA:carbonic acid (4:3) | 1 | of the invention |
| DEAEA:carbonic acid (4:1) | 1 | of the invention |
| (free bases) | | |
| DMAPA | 5 | comparative |
| DEAPA | 5 | comparative |
| DMAEA | 5 | comparative |
| DEAEA | 5 | comparative |
| triethylene diamine | 2 | comparative |
| N—methylmorpholine | 4 | comparative |
| N—ethylmorpholine | 4 | comparative |
| N,N,N',N'—teramethyl-ethylenediamine | 4 | comparative |
| triethylamine | 4 | comparative |
| N,N,N',N'—tetramethyl- | 3 | comparative |

TABLE I-continued

| Catalysts | Odor | Remarks |
|---|---|---|
| hexamethylenediamine | | |

Note:
0: non-odor
1: almost non-odor
2: a little odor
3: considerable odor
4: heavy odor
5: non-tolerable odor

EXAMPLE 1

Comparison of triethylenediamine (TED) and DMAPA-carbonic acid salts in PVC discoloration of semi-flexible molded foam having PVC surface skin A sheet of clear PVC was placed in a mold die and a mold foam having PVC surface skin was prepared by the following formulation:

TABLE II

| Formulation | comparative | invention 1 | Invention 2 |
|---|---|---|---|
| SANNIX FA-722 (#1) | ← | 82 | → |
| SANNIX FA-728 (#2) | ← | 20 | → |
| NEWPOL NP-400 (#3) | ← | 20 | → |
| Water | ← | 3 | → |
| TED 33% dipropyleneglycol solution | 0.4 | 0 | 0 |
| DMAPA-carbonic acid (4:3) | 0 | 0.4 | 0 |
| DMAPA-carbonic acid (4:1) | 0 | 0 | 0.4 |
| TDI prepolymer (NCO 21.0%) | ← | 105 (as NCO index) | → |

Note #1:
SANNIX FA-722 color (APHA) 80, OH-value 55, pH 6.0, moisture 0.05%, viscosity (at 25° C.) 750 cps., ethylene oxide-tipped polyol formulated polyetherpolyol
Note #2:
SANNIX FA-728 polymerpolyol (reaction product of polyetherpolyol and acrylonitrile) formulated; OH-value 24 to 29, pH 7 to 10, moisture 0.15% max., acid value 0.5 max., viscosity (at 25° C.) 5,000 cps. max.
Note #3:
NEWPOL NP-400 diethylene triamine (1 mole) - propylene oxide (5 mole) adduct The above products are manufactured by Sanyo Chemical Industries, Ltd.

Each of the test piece foams having PVC sheets were packed with aluminum foil and treated at 120° C. for 50 hours. Then the discoloration degrees of PVC sheets were ranked. The ranking was represented as follows: 1—slightly colored; 2—orange colored; 3—red colored; 4—reddish brown colored; and 5—black colored.

TABLE III

| Catalyst | Discoloration Degree |
|---|---|
| TED 33% dipropyleneglycol solution | 4.0 |
| DMAPA-carbonic acid (4:3) | 2.5 |
| DMAPA-carbonic acid (4:1) | 1.5 |

A sheet of PVC was treated with the above conditions. The discoloration degree was 1.

EXAMPLE 2

Comparison of N,N,N',N'-teramethylethylenediamine (TMED) and DMAPA-carbonic acid (4:3) for high resilience foam High resilience mold foam was prepared by using the foaming recipe as shown in Table IV, and the physical properties were measured. The foaming conditions were as follows: 25° C. of raw ingredients, mold temperature 50±2° C., curing condition 100° C. for 5 minutes, an aluminum mold die of 30×30×5 cm. mold release agent: A-520, made by Chyukyo Yushi.

TABLE IV

| | (Unit) | Comparative | Invention |
|---|---|---|---|
| (Formulation) | | | |
| SANNIX FA-702 (#4) | (g) | 70 | 70 |
| SANNIX FA-728 | (g) | 30 | 30 |
| Water | (g) | 2.5 | 2.5 |
| TED 33% dipropyleneglycol solution | (ml) | 0.8 | 0.8 |
| TMED | (ml) | 0.3 | — |
| DMAPA-carbonic acid (4:3) | (ml) | — | 0.3 |
| Toray Silicone SRX-274 C | (ml) | 2.0 | 2.0 |
| Isocyanate mixture (#5) | (g) | 33.3 | 33.3 |
| Rise Time | (sec) | 85 | 86 |
| Appearance of Foam | | good | good |
| (Foam Properties) | | | |
| Core density | (kg/m$^3$) | 48.1 | 47.6 |
| Tensile strength | (kg/cm$^2$) | 1.26 | 1.23 |
| Elongation | (%) | 125 | 124 |
| Tear strength | (kg/cm) | 0.58 | 0.60 |
| ILD 25% stress | (kg/314 cm$^2$) | 16.8 | 16.5 |
| 65% stress | | 43.0 | 42.5 |
| Ball rebound | (%) | 55 | 56 |
| Compression set, dry set, 70° C. | (%) | 4.2 | 4.2 |
| (22 hrs) wet set, 50° C., 95% RH | (%) | 13.2 | 12.9 |

Note #4:
SANNIX FA-702 ethylene oxide-tipped polyol formulated polyetherpolyol, color (APHA) 75 max., OH-value 35 to 40.5, pH 5.5 to 7.5, moisture 0.1% max., viscosity at 25° C. 830 to 970 cps.
Note #5:
Isocyanate mixture TDI-80/crude MDI = 8/4 by weight Rise time, foam appearance and physical properties of the resulting foams, both of comparative foam and the invention foam, were almost equal level; that is, non-odorous DMAPA-carbonic acid (4:3) catalyzed HR molded foam had good foaming and physical properties in comparison with TMED-catalyzed foam which had an objectionable odor.

Furthermore, when using the DMAPA-carbonic acid (4:3) in the present invention, the rise time was almost the same with that of TMED, but the cream time was a little longer and the initial rise had a tendency to delay, and therefore, the excellent flow property of the foaming mixture was obtained. It is expected that the catalysts in the present invention are suitable for complicated shape molding and the moldability is much improved with the catalysts of the invention.

At demolding time, TMED-catalyzed system gave very strong objectionable odor, but the catalysts of this invention gave almost no odor.

A similar result to the above DMAPA-carbonic acid (4:3) catalyst was obtained with using DMAPA-carbonic acid (4:1).

EXAMPLE 3

Comparison of N-methylmorpholine (NMM) and DMAPA-carbonic acid (4:3) for hot mold foam Hot mold flexible foams were prepared by using the foaming recipe shown in Table V, and the physical properties were determined.

Foaming conditions were as follows: raw material temperature 25° C., mold temperature 40° C., cure temperature × times 150° C. × 10 minutes, mold release agent the same as Example 2, mold temperature at demolding time 80° to 85° C.

TABLE V

| Number | | 1 | 2 | 3 | 4 | 5 | 6 |
|---|---|---|---|---|---|---|---|
| Polyol (#6) | (g) | ←←←← 100 →→→→ | | | | | |
| Water | (g) | ←←←← 3.5 | | | | 4.0 | 4.0 |
| TED 33% dipropylene-glycol soln. | (g) | 0.3 | ←←← 0.24 →→→ | | | | |
| NMM | (ml) | — | 0.3 | — | — | 0.3 | — |
| DMAPA.carbonic acid (4:3) | (ml) | — | — | 0.05 | 0.1 | — | 0.05 |
| Silicone SRX-294A (Toray) | (ml) | ←←←← 1.0 →→→→ | | | | | |
| Stannous octoate | (ml) | ←←←← 0.06 →→→→ | | | | | |
| TDI-80 | (g) | ←←←← 42.3 →→→→ | | | | | |
| Isocyanate index | | ←←←← 100 →→→→ | | | | | |
| Curing | | Ex | Ex | Ex | Ex | G | G |
| Core density | (kg/m³) | 41.1 | 41.4 | 41.5 | 41.1 | 38.5 | 37.3 |
| Tensile strength | (kg/cm²) | 1.28 | 1.48 | 1.48 | 1.50 | 1.46 | 1.63 |
| Elongation | (%) | 192 | 200 | 195 | 193 | 197 | 197 |
| Tear strength | (kg/cm) | 0.79 | 0.77 | 0.78 | 0.80 | 0.92 | 0.81 |
| ILD, 25% stress | (kg/341 cm²) | 18.5 | 18.8 | 19.6 | 19.2 | 18.5 | 18.6 |
| 65% stress | (kg/341 cm²) | 43.0 | 45.4 | 47.0 | 46.5 | 44.2 | 44.5 |
| Ball rebound, core | (%) | 49 | 52 | 50 | 50 | 52 | 52 |
| Compression set | (%) | 6.7 | 6.5 | 6.5 | 7.0 | 8.6 | 8.5 |

Note #6: Polyol
ethylene oxide-tipped triol, OH-value 53, acid value less than 0.1 moisture content less than 0.07%, viscosity (at 25° C., BL-type viscometer) 540 cps., pH 6.5 ± 0.5, color (APHA) 10
DMAPA.carbonic acid (4:3) - catalyzed system gave a little longer cream time and better flow propety and no odor problem at the demolding time.

DMAPA-carbonic acid (4:3) catalyzed system gave a little longer cream time and better flow property and no odor problem at the demolding time.

Further, one-third to one-sixth of dosage of the catalyst in the present invention compared with the used amount of NMM was enough for obtaining good foam, which is economical. A similar result to DMAPA-carbonic acid (4:3) was obtained in the case of DMAPA-carbonic acid (4:1).

EXAMPLE 4

Comparison of triethylamine (TEA) and DMAPA-carbonic acid (4:3) in flow property of foaming mixture at the initial stage of HR mold foaming In Example 2, TEA (0.3 ml) was used in place of TMED (0.3 ml each). Other foaming conditions were the same as in Example 2.

An aluminum mold die (5 cm length×30 cm width×30 cm depth) having a bunghole in the center of the top surface and a vent hole in the right end of the top surface was used.

In the formulation containing the catalyst of the present invention, the initial reaction polymerization product had an improved flow property and filled in each corner completely. Therefore, a perfect shape was obtained without any void.

On the contrary, the comparative system had poor flow property, and therefore, an air void of 5×5×5 cm size was found in the left end of the bottom of the cubic shape foam.

EXAMPLE 5

Manufacture of molded foam having surface skin of polyurethane elastomer (1) The following solution was sprayed inside a cast iron mold die which had been coated with a release agent and heated at 70° C., and dried.

| one component type linear polyurethane elastomer (#) | | 100 (pbw) |
|---|---|---|
| Carbon black | | 1 |
| Methylethylketone | | 100 |
| Note (#): Reaction product from polybutyleneadipate diol, diphenylmethanediisocyanate and ethyleneglycol | | 30 (pbw) |
| DMF | | 20 |
| Methylethylketone | | 50 |

(2) The following two component type polyurethane elastomer mixture was overlapped on the surface of the above-mentioned (1) coating layer by using a spray gun so that the thickness might be about 0.5 mm.

| (Prepolymer component) | | |
|---|---|---|
| Polyetherpolyol (average mol. weight 2,500) and tolylenediisocyanate were reacted with the NCO/OH ratio of 2.0. The resulting prepolymer was diluted with toluene at the ratio of 90/10. | | 100 parts |
| (Curing component) | | |
| Polyoxypropylene-oxyethylene triol (average mol. weight 3,000) | | 76 parts |
| Diphenylmethanediamine | | 23 parts |
| Triethylenediamine | | 0.2 part |
| Dimethylethanolamine | | 0.8 part |

(3) Prior to complete curing of the above-mentioned (2) elastomeric coating, the following cold-cure flexible foam mixture was poured in the mold and the resulting foam was demolded after curing ten minutes at room temperature in the mold. The foam was aged at room temperature overnight. Finally, the flexible molded foam covered with polyurethane elastomer was obtained.

| SANNIX FA-702 | (g) | 70 |
|---|---|---|
| SANNIX FA-728 | (g) | 30 |
| Water | (g) | 2.5 |
| TED 33% DPG solution | (ml) | 0.8 |
| DMAPA-carbonic acid (4:3) | (ml) | 0.3 |
| Toray silicone SRX-274 | (ml) | 2.0 |
| Isocyanate mixture | (g) | 33.3 |

What is claimed is:

1. In a method of manufacturing polyurethane foam by reacting organic polyisocyanates and polyols in the presence of a foaming agent, a catalyst, and the like, the improvement comprising employing as the catalyst, a salt of carbonic acid and a polyamine represented by the general formula:

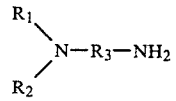

wherein $R_1$ and $R_2$ are an alkyl group having 1–4 carbon atoms or $R_1$ and $R_2$ are combined to form a heterocyclic ring having 3–6 carbon atoms together with the nitrogen atom; and $R_3$ is an alkylene group.

2. In a method of manufacturing polyurethane molded foam having a surface skin by the reaction of organic polyisocyanates and polyols in the presence of a foaming agent and a catalyst, the improvement comprising employing a salt of carbonic acid as the catalyst and a polyamine represented by the general formula

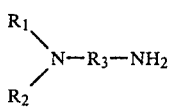
wherein $R_1$ and $R_2$ are an alkyl group having 1–4 carbon atoms or $R_1$ and $R_2$ are combined to form a heterocyclic ring having 3–6 carbon atoms together with the nitrogen atom; and $R_3$ is an alkylene group.
3. The method of claim 1 or 2 wherein $R_1$ and $R_2$ are methyl and $R_3$ is n.propylene.
4. The method of claim 1 or 2 wherein $R_1$ and $R_2$ are methyl and $R_3$ is ethylene.
* * * * *

UNITED STATES PATENT AND TRADEMARK OFFICE
CERTIFICATE OF CORRECTION

PATENT NO. : 4,517,313
DATED : May 14, 1985
INVENTOR(S) : Keiichi Nakatani

It is certified that error appears in the above—identified patent and that said Letters Patent is hereby corrected as shown below:

On the cover page of above-captioned patent, delete the Assignee: Abbott Laboratories, North Chicago, Illinois, and substitute therefor as Assignee: San-Abbott Limited, Kyoto, Japan.

Signed and Sealed this

Eighth Day of October 1985

[SEAL]

Attest:

DONALD J. QUIGG

Attesting Officer

Commissioner of Patents and Trademarks—Designate